(12) United States Patent
Nahm et al.

(10) Patent No.: US 7,422,718 B2
(45) Date of Patent: Sep. 9, 2008

(54) MULTI-INSERT CAP BLOW-MOLDING METHOD AND SPOILER FOR VEHICLE MANUFACTURED USING THE SAME

(75) Inventors: Alexander Hong Nahm, Gyeongsangbug-do (KR); O Yeol Kwon, Daegu-si (KR)

(73) Assignee: Moya International Co., Ltd., Chilgog-gun (KR)

( * ) Notice: Subject to any disclaimer, the term of this patent is extended or adjusted under 35 U.S.C. 154(b) by 43 days.

(21) Appl. No.: 11/297,064

(22) Filed: Dec. 8, 2005

(65) Prior Publication Data
US 2007/0069549 A1    Mar. 29, 2007

(30) Foreign Application Priority Data
Sep. 28, 2005    (KR) ................ 2005-90340

(51) Int. Cl.
*B29C 49/20*    (2006.01)

(52) U.S. Cl. ..................... 264/515; 264/516

(58) Field of Classification Search .......... 264/515–516
See application file for complete search history.

(56) References Cited

U.S. PATENT DOCUMENTS

| | | | |
|---|---|---|---|
| 6,293,613 B1 | 9/2001 | Choi | |
| 6,531,020 B2 | 3/2003 | Choi | |
| 7,125,466 B2 * | 10/2006 | Cooper et al. | 156/244.14 |

* cited by examiner

*Primary Examiner*—Suzanne E. McDowell
(74) *Attorney, Agent, or Firm*—Volpe and Koenig P.C.

(57) ABSTRACT

A multi-insert cap blow-molding method for molding a hollow plastic product which is integrally formed with elongate fastening members. Each fastening member is seated in a groove defined in a lower mold. Each fastening member is composed of an elongate outer insert cap and an inner insert cap which is positioned in the outer insert cap to be separated from a bottom surface of the outer insert cap and to divide a space defined in the outer insert cap into an upper space and a lower space. A hollow parison is positioned between an upper mold and the lower mold. Hot air is blown into the parison with the upper and lower molds enclosing the parison to mold the parison and integrally fuse a portion of the parison to an inner surface of the fastening member. Then, the resultant product which is cooled, discharged and finished.

10 Claims, 12 Drawing Sheets

MULTI-INSERT CAP BLOW-MOLDING METHOD AND SPOILER FOR VEHICLE MANUFACTURED USING THE SAME

BACKGROUND OF THE INVENTION

1. Field of the Invention

The present invention relates, in general, to a blow-molding method for manufacturing a product by blowing compressed air, and, more particularly, to a multi-insert cap blow-molding method and a spoiler for a vehicle manufactured using the same, wherein a hollow plastic product is molded by blowing air into a hollow parison between upper and lower molds in a state in which an outer insert cap and an inner insert cap are positioned in a fastening member-seating groove, thereby being capable of integrally fusing a fastening member of a substantial height to the body of the product.

2. Description of the Prior Art

As is well known to those skilled in the art, various methods for forming a plastic product are employed depending upon the shape and the material of the product. Typical methods for forming a plastic product include a blow-molding method. In the blow-molding method, a parison or a sheet made of plastic is softened by being heated due to its thermoplastic characteristic and is positioned between split molds. Then, compressed air is supplied into the parison or sheet, and the parison or sheet is inflated against the surfaces of the molds. In this state, by cooling the parison or sheet, the manufacture of a hollow plastic product is completed. That is to say, in the conventional blow-molding method, a thermoplastic plastic material which is heated and softened is extruded and preformed in the shape of a tube to form a parison. Then, the parison is placed between molds which are adopted for the blow-molding method, and is heated and softened. Thereupon, by blowing air into the parison, an end product is obtained.

Meanwhile, many shapes of air spoilers have been used in conformity with the kinds of vehicles. The air spoilers for vehicles function to prevent vehicle bodies from being lifted under the influence of air currents created when the vehicles travel at high speeds, thereby ensuring driving stability at high speeds.

An air spoiler and a manufacturing method thereof as disclosed in U.S. Pat. Nos. 6,531,020 and 6,293,613 will be described below. As shown in FIGS. 1A and 1B, an air spoiler 10 for a vehicle is installed at the rear end of a vehicle body 12 to extend in a widthwise direction of a trunk lid 11. A plurality of fastening members 20 are integrally coupled to the lower surface of the spoiler 10 so as to fasten the spoiler 10 to the upper surface of the trunk lid 11 in a state in which the spoiler 10 is separated from the upper surface of the trunk lid 11 by a predetermined distance.

Each fastening member 20 has a cup-shaped fastening member body 21 which has a predetermined height, and a flange 22 which is formed integrally with the upper end of the fastening member body 21 to be fused to the outer surface of a hollow spoiler body. The bottom wall of the fastening member body 21 is defined with a plurality of vent holes 23 for discharging air existing in the fastening member 20 to the outside when the fastening member 20 is fused with the spoiler body. A locking bolt 24 for fastening the fastening member 20 to the trunk lid 11 of the vehicle is secured to the bottom wall of the fastening member body 21.

The spoiler 10 is manufactured using the blow-molding method as described above. When manufacturing the spoiler 10 using the blow-molding method, the fastening member 20 is fused with the outer surface of a hollow parison which is a preform of the spoiler body.

FIGS. 2A and 2B are schematic cross-sectional views illustrating a procedure for manufacturing the spoiler for a vehicle using the blow-molding method according to the conventional art. In particular, a method for fusing the fastening member to the hollow parison will be described with reference to these drawings.

First, an upper mold 30 and a lower mold 40 each of which is defined with a cavity 50 to form a predetermined shape of a spoiler by the blow-molding method are prepared. The upper surface of the lower mold 40 which defines the cavity 50 is also defined with a plurality of seating grooves 41 into which the fastening members 20 are inserted, respectively. An air discharge passage 42 is defined at the bottom of each seating groove 41 to discharge air existing in the fastening member 20 to the outside.

After the fastening member 20 is seated in the seating groove 41, the hollow parison 60 is placed between the upper mold 30 and the lower mold 40, and the upper mold 30 is moved downward to enclose the hollow parison 60. Then, as shown in FIG. 2B, with the upper and lower molds 30 and 40 enclosing the hollow parison 60, compressed hot air is blown into the parison 60. Thereupon, the parison 60 is fused by the blown hot air and is inflated against the surfaces of the molds 30 and 40 which define the cavities 50, whereby a spoiler body 13 having a predetermined shape is formed. At the same time with this, a portion of the parison 60 which is overlapped with each fastening member 20 is inflated into the fastening member 20 and is fused to the inner surface of the fastening member 20. At this time, the air existing in the fastening member 20 is discharged to the outside through the plurality of vent holes 23 which are defined in the bottom wall of the fastening member 20.

Finally, as the molds 30 and 40 are cooled, the parison 60 is gradually hardened, and the spoiler 10 for a vehicle is produced in a state in which the plurality of fastening members 20 are integrally coupled to the outer surface of the spoiler body 13 having the predetermined shape.

However, in the fastening member 20 molded as described above, in the case that the distance measured between the spoiler 10 and the trunk lid 11 is substantial, that is, the height of the fastening member 20 is substantial as shown in FIGS. 3A and 3B, the material of the parison 60 is not uniformly fused with the fastening member 20 along the height of the fastening member 20 but can be gradually decreased in its thickness along the height of the fastening member 20 or can be exhausted at any point on the height of the fastening member 20.

If the fastening member 20 is molded in this way and the material of the parison 60 is not uniformly fused with the fastening member 20 along the height of the fastening member 20, the strength of the fastening member 20 fused with the spoiler 10 is degraded, and the fastening member 20 is likely to be broken after the spoiler 10 is fastened to the trunk lid 11.

Also, due to the fact that the material of the parison 60 fused to the fastening member 20 cannot have a uniform thickness, durability of the fastening member 20 is decreased, and vehicle-driving stability may be deteriorated.

SUMMARY OF THE INVENTION

Accordingly, the present invention has been made keeping in mind the above problems occurring in the prior art, and an object of the present invention is to provide a multi-insert cap blow-molding method wherein, when molding a plastic product having integrally fused thereto a fastening member by blowing air into a hollow parison, a separate inner insert cap is disposed in an outer insert cap which defines an outer contour of the fastening member having a substantial height, so that the plastic product having stably integrated therewith the fastening member can be manufactured.

Another object of the present invention is to provide a spoiler for a vehicle to be mounted to the trunk lid of a vehicle, wherein a fastening member composed of an outer insert cap and an inner insert cap which are separately produced is fused with a spoiler body so that sufficient durability can be accomplished when the spoiler is mounted to the vehicle.

In order to achieve the above objects, according to one aspect of the present invention, there is provided a multi-insert cap blow-molding method for molding a hollow plastic product to which elongate fastening members each having a deep groove are fused, the method comprising a fastening member seating process for seating an outer insert cap and an inner insert cap constituting each fastening member in a fastening member seating groove which is defined in a lower mold; a parison positioning process for positioning a parison between an upper mold and the lower mold which are defined with cavities; an air blowing process for blowing compressed hot air into the parison and molding the parison; and a product discharging process for discharging and finishing a resultant product.

According to another aspect of the present invention, in the process for fusing the fastening members to the hollow plastic product, each fastening member is constituted by the outer insert cap which defines an outer appearance of the elongate fastening member and the inner insert cap which is disposed in the outer insert cap to be separated from the bottom surface of the outer insert cap by a predetermined distance and to divide the space defined in the outer insert cap into an upper space and a lower space, whereby, in the air blowing process, the softened parison can be stably fused to the inner surface of the upper space of the outer insert cap which is delimited by the inner insert cap.

In the fastening member seating process, each elongate fastening member to be fused to the hollow plastic product is positioned in the mold in a state in which the fastening member is largely constituted by the outer insert cap and the inner insert cap.

It is optionally supposed that the mold comprises an upper mold and a lower mold. The upper mold and the lower mold are defined with the cavities which define the configuration of the hollow plastic product to be molded. The upper surface of the lower mold which delimits the cavity is defined with the fastening member seating groove which has a predetermined depth and into which the fastening member is seated. Accordingly, the fastening member, which includes the outer insert cap defining the outer appearance and the inner insert cap disposed in the outer insert cap, is seated to conform to the contour of the fastening member seating groove.

At this time, the inner inset cap is positioned to be separated from the bottom surface of the outer insert cap by the predetermined distance. Preferably, the inner insert cap has an upper plate positioned at a predetermined height in the outer insert cap and functions to divide the space defined in the outer insert cap into the upper space and the lower space. A plurality of supporting legs is formed on the lower surface of the plate to stand the pressure of air supplied into the parison in the air blowing process.

The outer insert cap which defines the outer appearance of the fastening member has a cup-shaped outer insert cap body which has a substantial depth. A flange is integrally formed on the upper end of the outer insert cap body so that the fastening member can be easily fused with the parison. A plurality of vent holes are defined in the bottom wall of the outer insert cap so that air existing in the outer insert cap can be discharged to the outside as the parison is introduced into the fastening member.

Preferably, the bottom wall of the outer insert cap and the upper plate of the inner insert cap are defined with blow pin insertion holes so that a tubular blow pin for blowing air into the parison can be inserted through the blow pin insertion holes. Also, the upper plate of the inner insert cap is separated from the inner surface of the side wall of the outer insert cap or is defined with a hole to crease an air discharge path so that air existing in the fastening member can be discharged through the air discharge path to the outside.

In the parison seating process, the softened hollow parison is conveyed and positioned between the upper and lower molds. The parison constitutes the body of the hollow plastic product which is molded in the subsequent air blowing process. After the parison is positioned in place, the upper and lower molds enclose the parison, as a result of which the parison is ready to be molded in conformity with the contours of the surfaces of the molds which define the cavities.

Then, in the air blowing process, air is blown into the parison which is positioned in the molds. At this time, while air is blown into the parison using the tubular blow pin, the distal end of the blow pin passes through one of the molds to be positioned in the parison. Therefore, air is blown into the parison through the distal end of the blow pin.

Preferably, the blow pin passes through an air discharge passage defined in the lower mold, the fastening member seating groove, and the blow pin insertion holes defined in the bottom wall of the outer insert cap and the upper plate of the inner insert cap, such that the distal end of the blow pin is positioned in the parison. As compressed hot air is blown through the blow pin into the parison, the parison is inflated to conform to the contours of the upper and lower molds which define the cavities.

At this time, a portion of the parison is introduced, by air pressure, into the fastening member seating groove in which the fastening member is seated. While the portion of the parison is fused to the inner surface of the side wall of the outer insert cap of the fastening member, it does not reach a substantially deep point and is blocked by the upper plate of the inner insert cap which is positioned in the outer insert cap. Thus, the portion of the parison which is introduced into the fastening member seating groove is fused to the inner surface of the upper space which is defined by the upper surface of the inner insert cap and the inner surface of the side wall of the outer insert cap, while having a predetermined thickness.

After the parison is molded to conform to the contours of the molds which define the cavities and forms a desired configuration, with the elongate fastening members integrally fused with the parison, the product discharging process is conducted, in which the resultant product is discharged and finishing work is implemented for the discharged product.

Preferably, in the product discharging process, the molds including the molded product are cooled by cooling water, etc., and the resultant product having integrally fused thereto the fastening members is discharged to undergo the finishing work.

In the hollow plastic product which is manufactured using the multi-insert cap blow-molding method, when integrally fusing the elongate fastening member to the parison, due to the fact that the inner insert cap is disposed in the outer insert cap which defines the outer appearance of the fastening member, it is possible to prevent the parison from being decreased in its thickness and from being exhausted at any point on the inner surface of the side wall of the fastening member.

It is to be readily understood that the multi-insert cap blow-molding method according to the present invention can be widely applied to manufacturing processes in which elongate hollow fastening members are fused to a product, such as in a spoiler, a bumper guard, a side step, a duct, and so forth, of a vehicle.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1A:
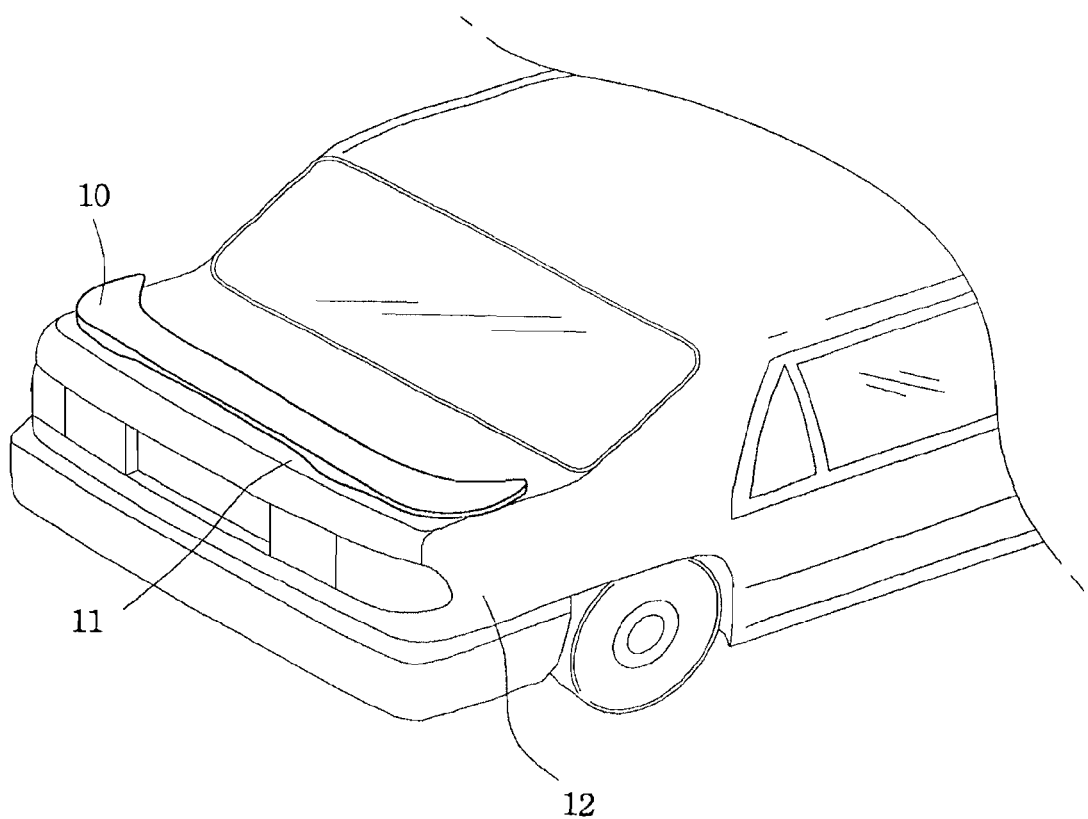
FIGS. 1A and 1B are drawings respectively illustrating the mounted state and the construction of a spoiler for a vehicle manufactured according to the conventional art.
Figure 1B:
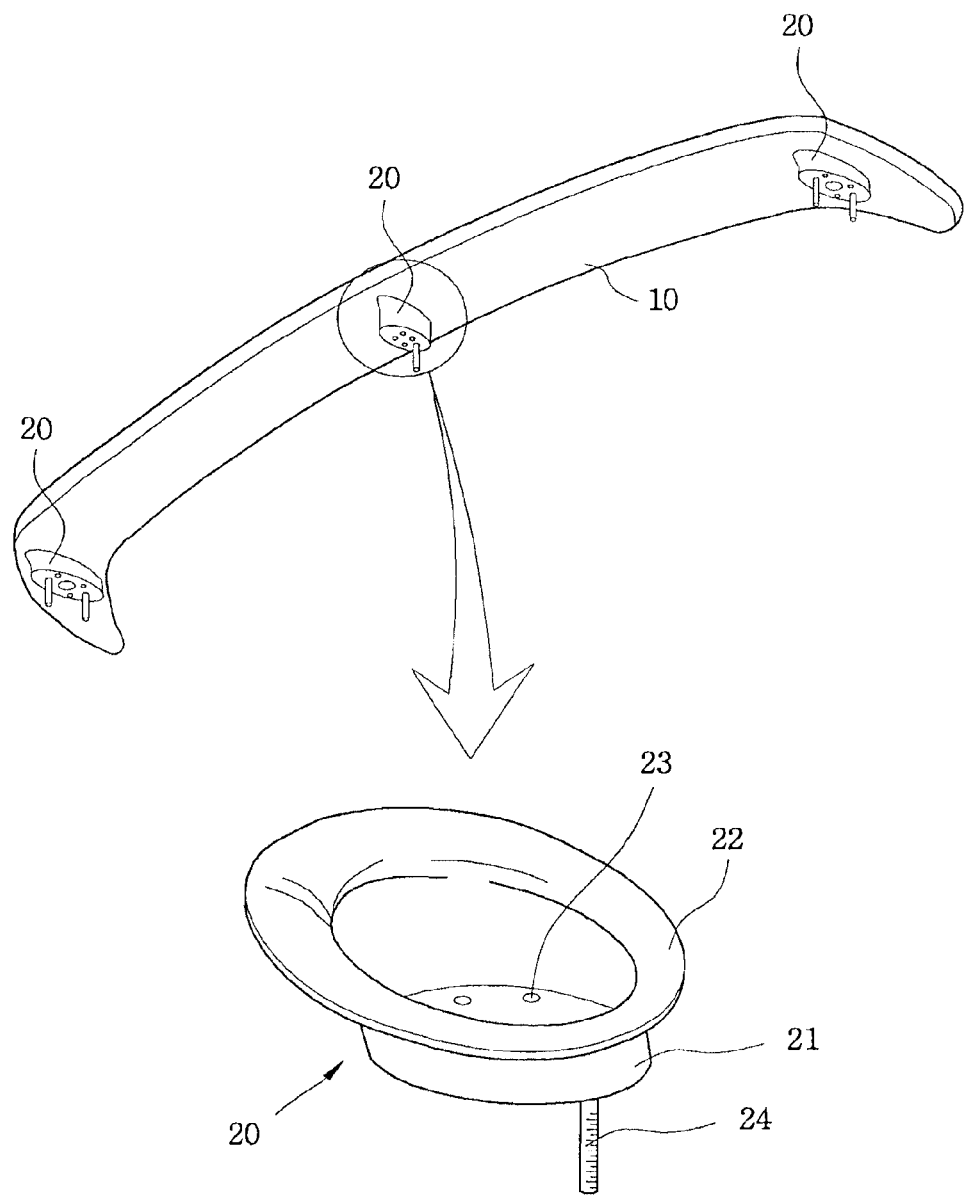
Figure 2A:
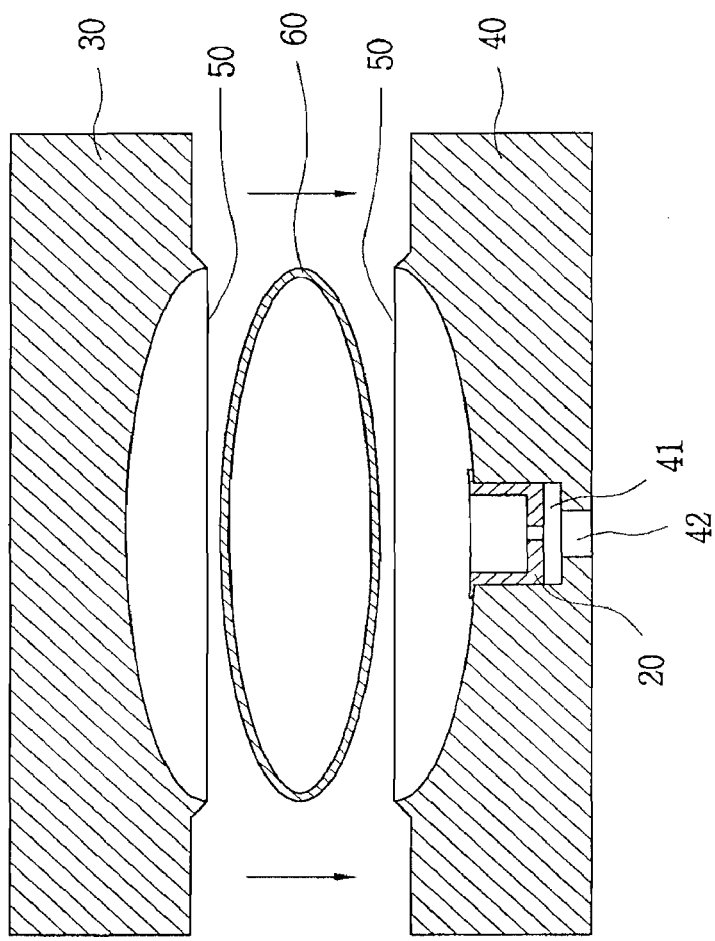
FIGS. 2A and 2B are cross-sectional views illustrating a procedure for manufacturing the spoiler for a vehicle using a blow-molding method according to the conventional art.
Figure 2B:
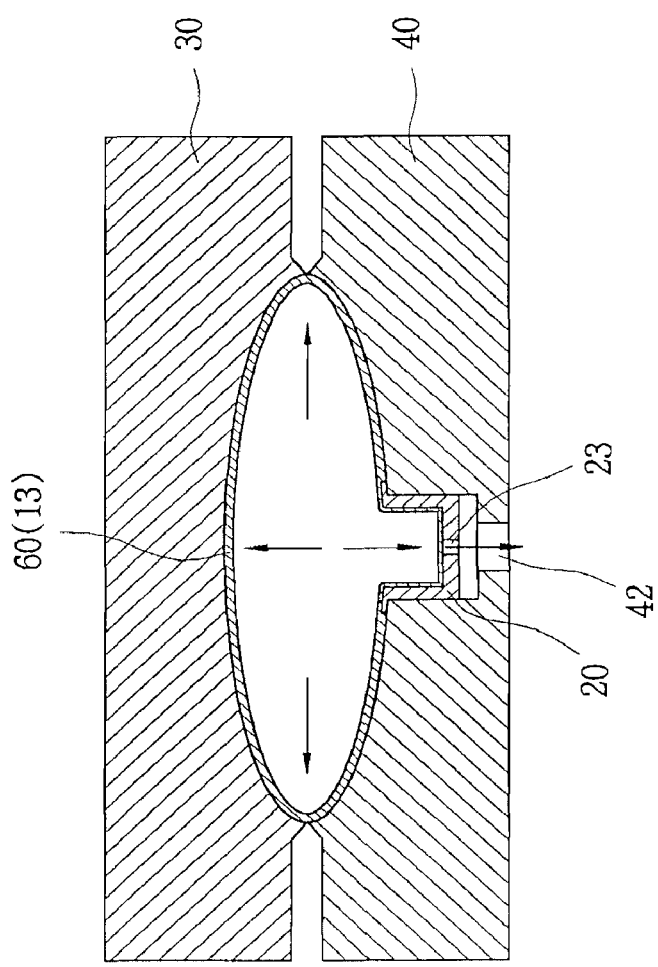
Figure 3:
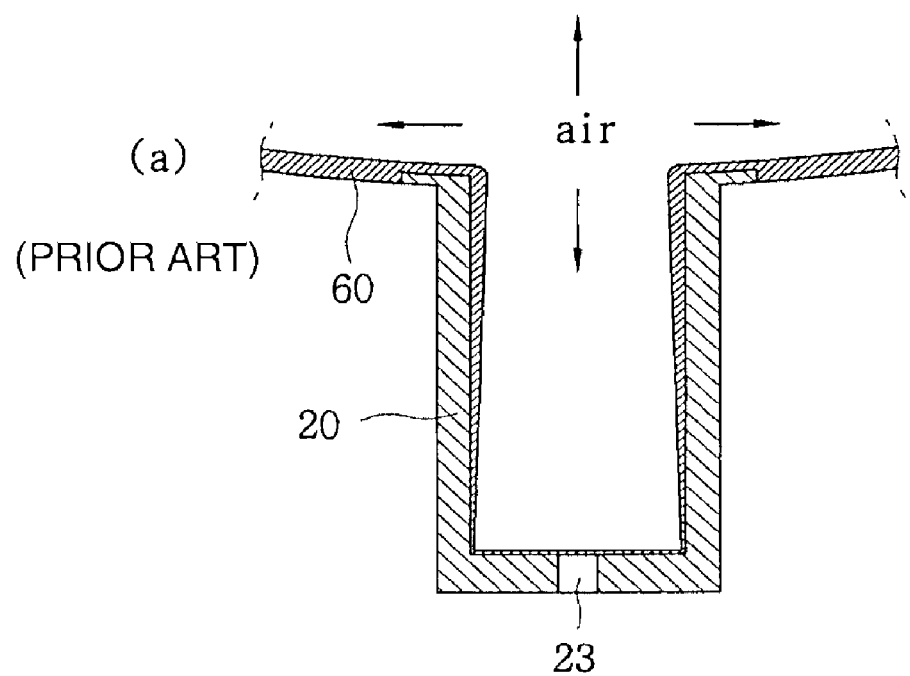
FIGS. 3A and 3B are cross-sectional view illustrating defects of the spoiler for a vehicle manufactured by the conventional blow-molding method.
Figure 3:
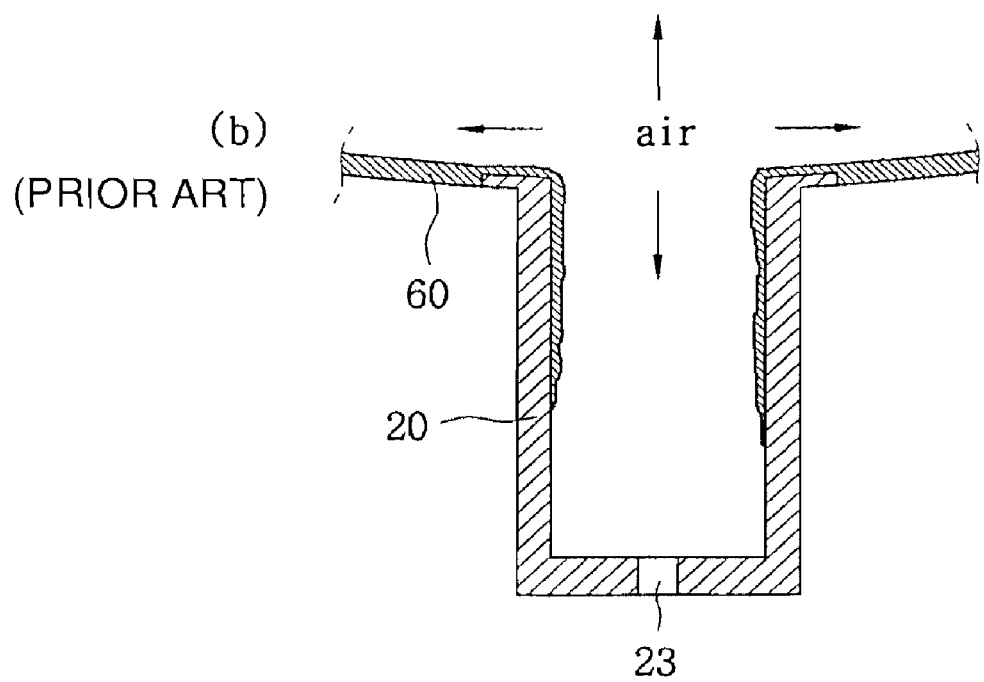

Reference will now be made in greater detail to a preferred embodiment of the invention, an example of which is illustrated in the accompanying drawings. Wherever possible, the same reference numerals will be used throughout the drawings and the description to refer to the same or like parts.

Figure 4:
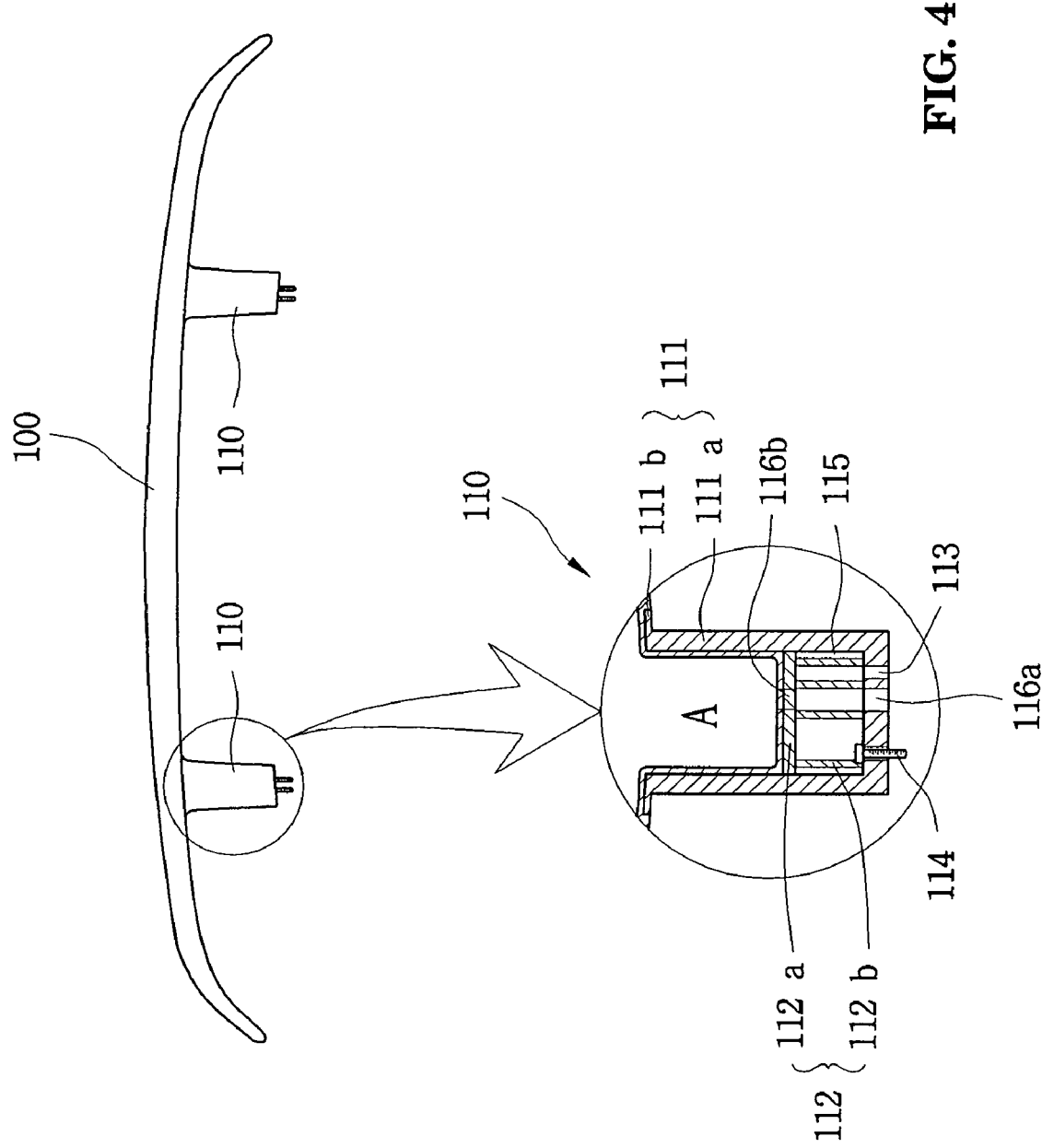
FIG. 4 is a partially enlarged and sectioned perspective view illustrating a multi-insert cap blow-molding method and a spoiler for a vehicle manufactured using the same in accordance with an embodiment of the present invention.
Figure 5A:
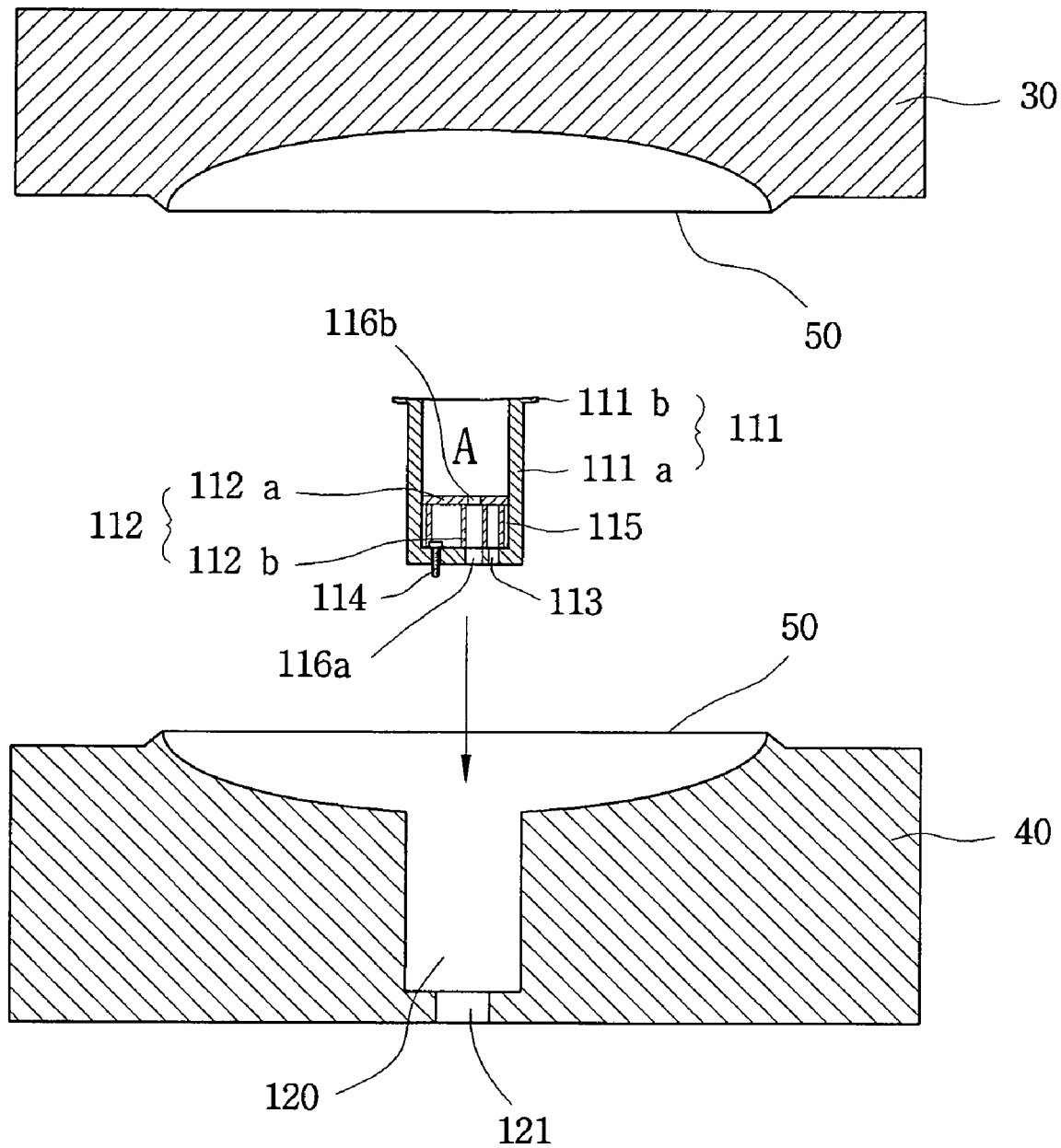
FIGS. 5A through 5E are cross-sectional views illustrating a procedure for manufacturing the spoiler for a vehicle using the multi-insert cap blow-molding method according to the present invention.
Figure 5B:
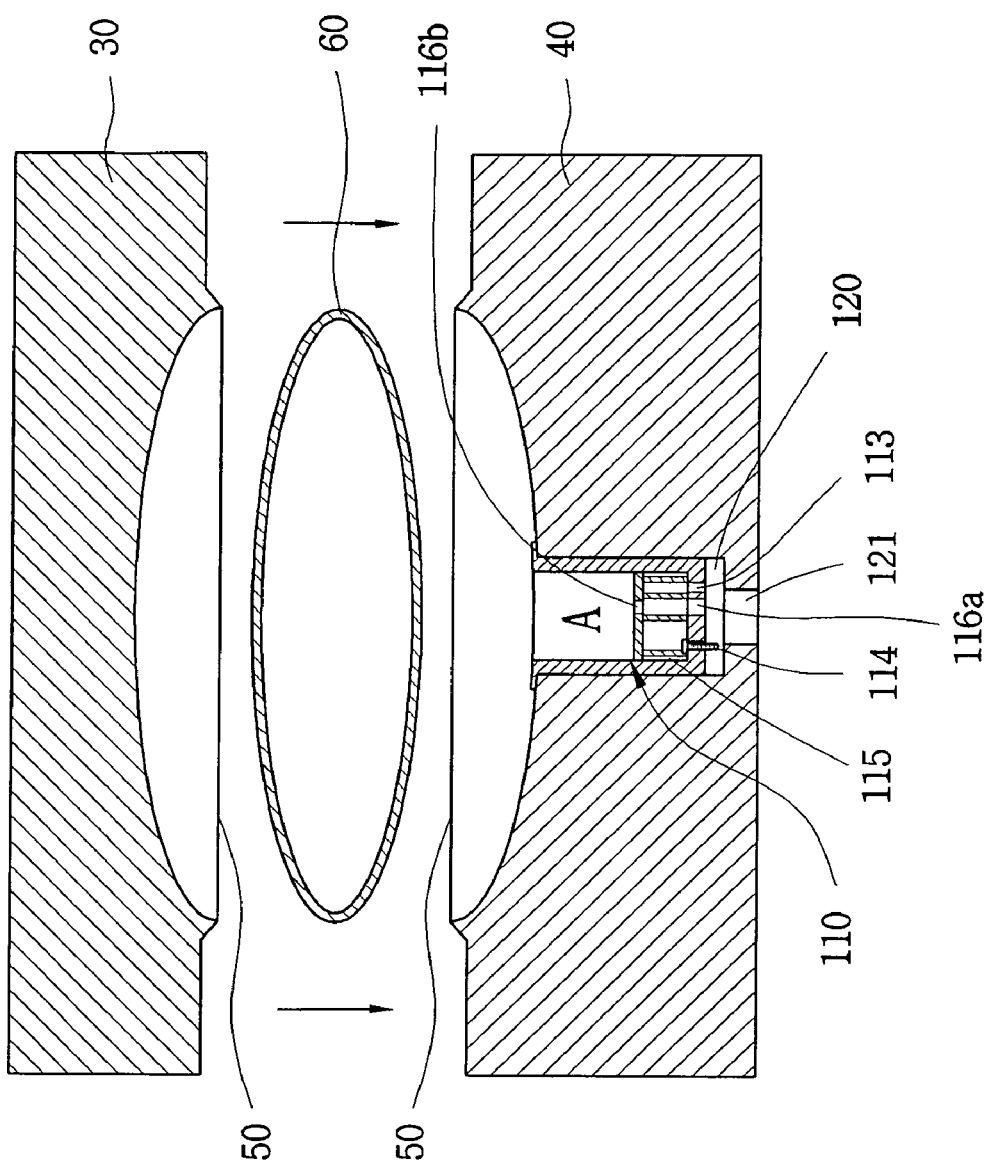
Figure 5C:
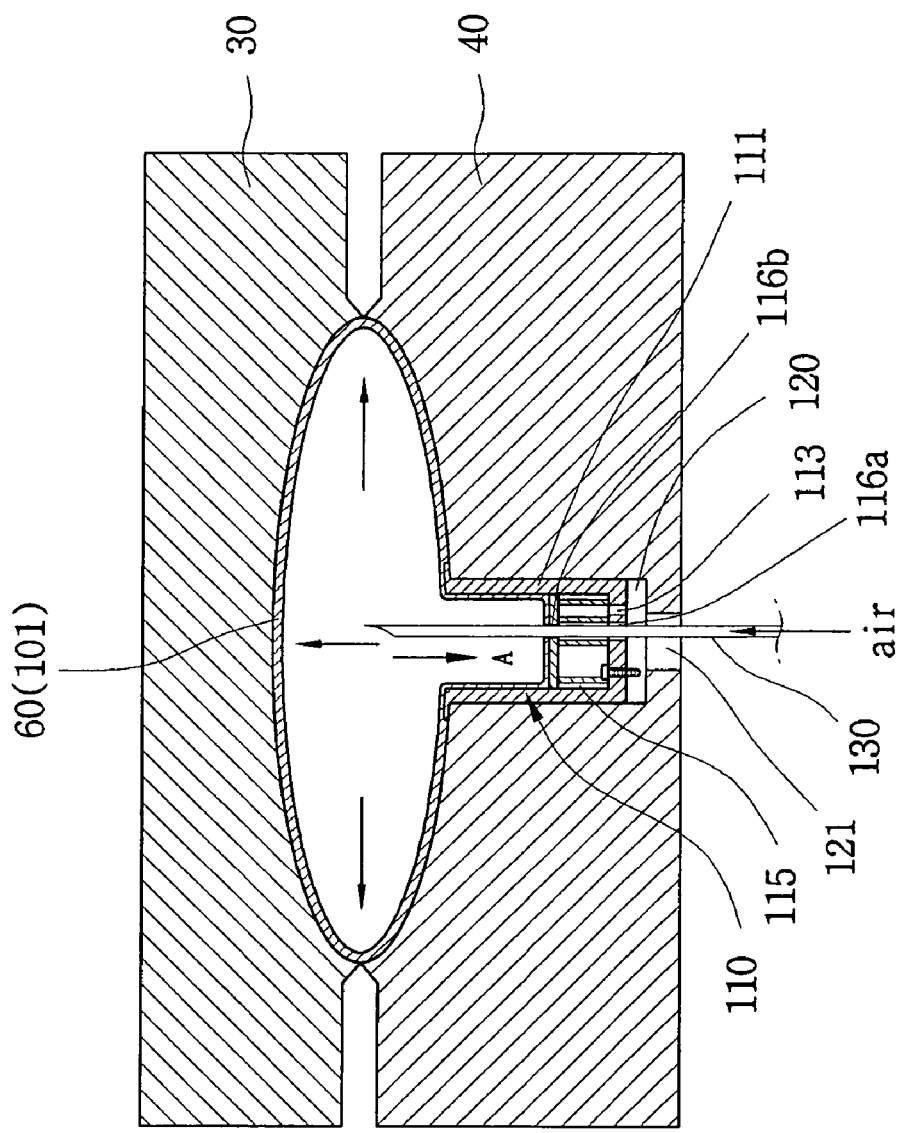
Figure 5D:
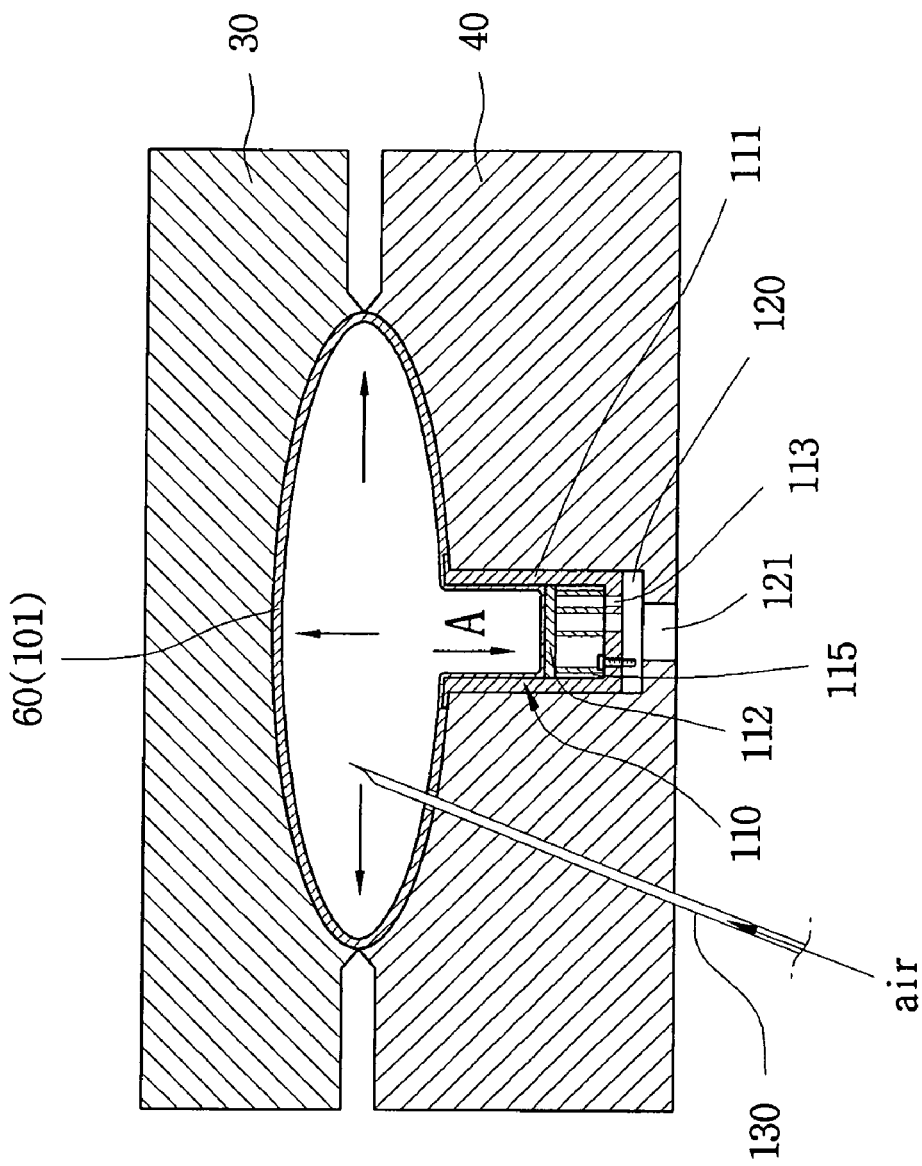
Figure 5E:
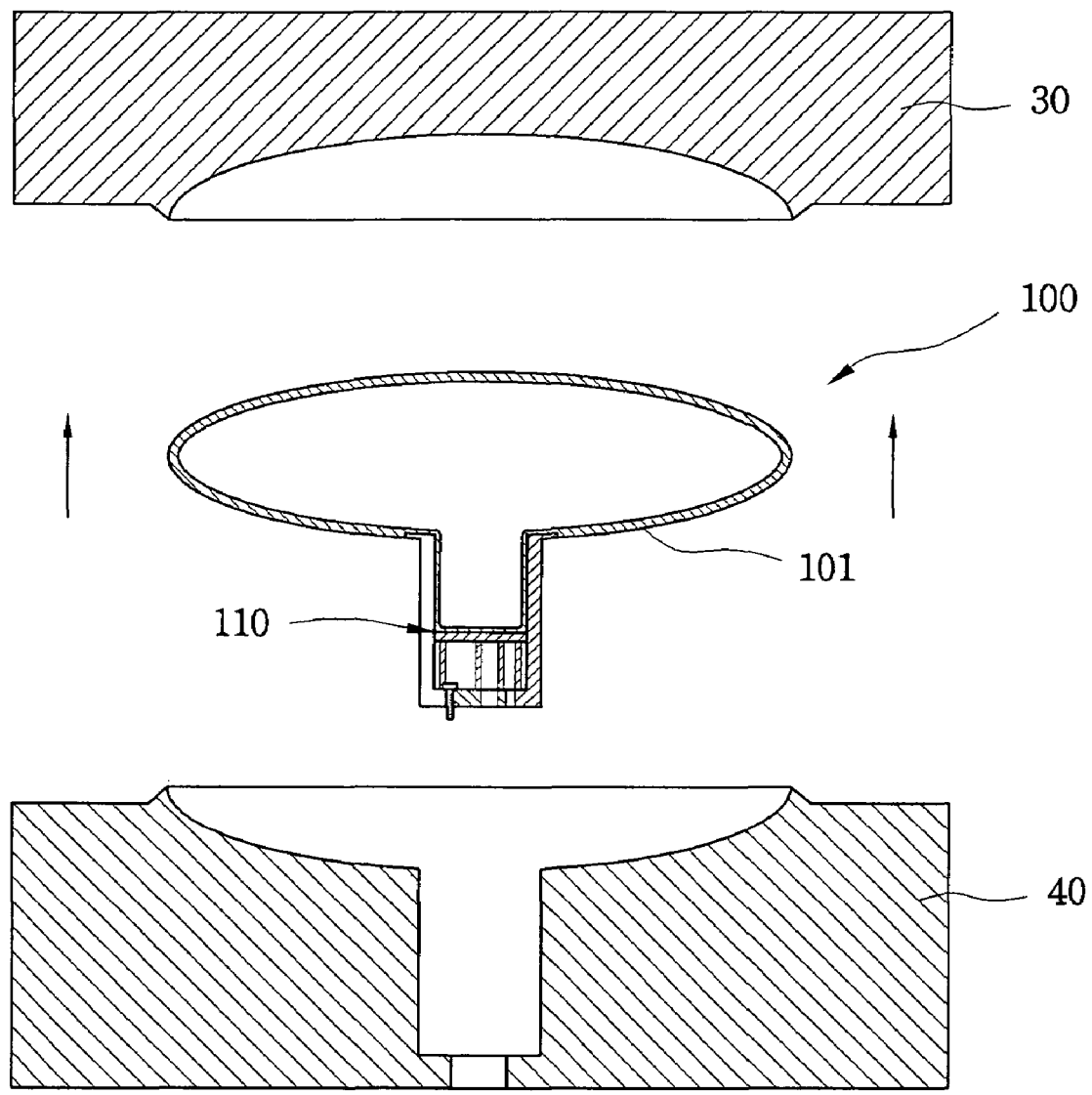
Figure 6:
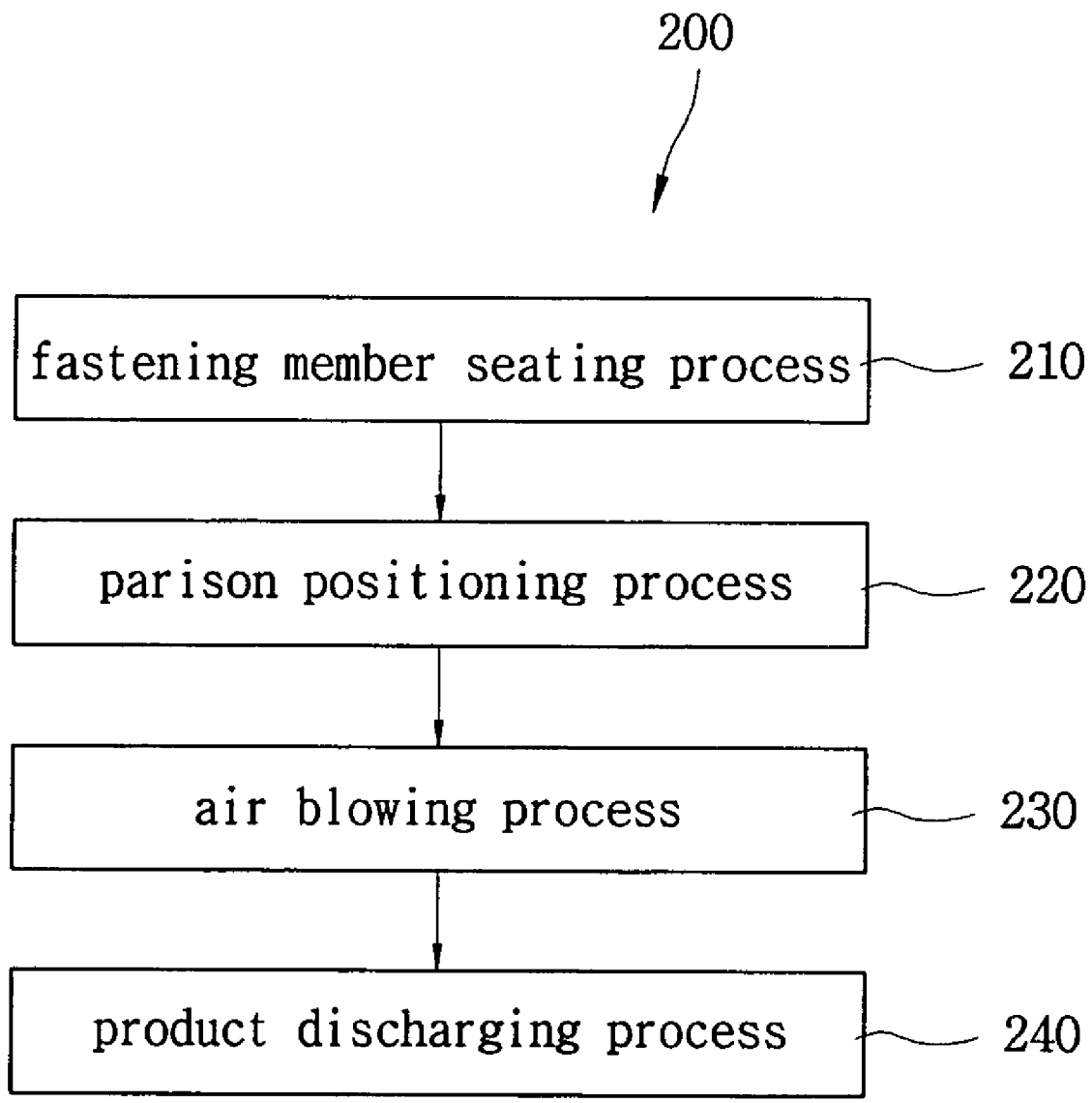
FIG. 6 is a flow chart illustrating the processes of the multi-insert cap blow-molding method according to the present invention.

FIG. 4 is a partially enlarged and sectioned perspective view illustrating a multi-insert cap blow-molding method and a spoiler for a vehicle manufactured using the same in accordance with an embodiment of the present invention, FIGS. 5A through 5E are cross-sectional views illustrating a procedure for manufacturing the spoiler for a vehicle using the multi-insert cap blow-molding method according to the present invention, and FIG. 6 is a flow chart illustrating the processes of the multi-insert cap blow-molding method according to the present invention.

A multi-insert cap blow-molding method 200 in accordance with an embodiment of the present invention allows an elongate fastening member to be integrally fused to a hollow plastic product. As can be readily seen from the drawings, the method according to the present invention can be applied to mold a spoiler for a vehicle.

Referring to FIG. 4, a plurality of fastening members 110 are integrally coupled to the lower surface of a spoiler 100 for a vehicle. The plurality of fastening members 110 function to fasten the spoiler 100 to the upper surface of a trunk lid in a state in which the spoiler 100 is separated from the upper surface of the trunk lid by a predetermined distance.

Each fastening member 110 is constituted by an outer insert cap 111 which defines an outer appearance of the fastening member 110 and an inner insert cap 112 which is disposed in the outer insert cap 111. The outer insert cap 111 comprises a cup-shaped outer insert cap body 111a which has a predetermined height and a flange 111b which is integrally formed with the upper end of the outer insert cap body 111a to be advantageously fused to the outer surface of a hollow spoiler body. A plurality of vent holes 113 are defined in the bottom wall of the outer insert cap body 111a so that air existing in the fastening member 110 can be discharged to the outside when fusing the fastening member 110 with the hollow spoiler body. A locking bolt 114 for fastening the fastening member 110 to the trunk lid of the vehicle is secured to the bottom wall of the outer insert cap body 111a. Preferably, a blow pin insertion hole 116a is defined in the bottom wall of the outer insert cap body 111a of the outer insert cap 111 such that a blow pin for blowing air into the hollow spoiler body can be inserted through the blow pin insertion hole 116a into the hollow spoiler body. When the blow pin is inserted from another point on a mold, the blow pin insertion hole 116a performs a function of the vent hole 113.

When the elongate fastening member 110 undergoes a molding process in which the elongate fastening member 110 is fused to the lower surface of the spoiler 100, the inner insert cap 112 reduces a volume of a space in which the parison is fused to the inner surface of the fastening member 110, thereby allowing the parison to be stably fused with a uniform thickness to the inner surface of the fastening member 110. The inner insert cap 112 comprises an upper plate 112a which is disposed in the outer insert cap 111 to be separated from the bottom wall of the outer insert cap 111 by a pre-selected distance and divides the space defined in the outer insert cap 111 into an upper space A and a lower space, and a plurality of supporting legs 112b which are formed on the lower surface of the upper plate 112a.

The upper plate 112a of the inner insert cap 112 is separated from the inner surface of the side wall of the outer insert cap 111 or is defined with a hole to create an air discharge space 115 so that air existing in the upper space A of the outer insert cap 111 can be easily discharged to the outside through the vent holes 113 of the outer insert cap 111 and an air discharge passage defined in the mold. The gap which is defined between the upper plate 112a and the inner surface of the side wall of the outer insert cap 111 to create the air discharge space 150 is closed by the parison which is fused in the air blowing process. Also, preferably, the upper plate 112a of the inner insert cap 112 is defined with a blow pin insertion hole 116b so that the blow pin can be inserted through the blow pin insertion hole 116b into the hollow spoiler body.

FIGS. 5A through 5E are cross-sectional views illustrating a procedure for manufacturing the spoiler 100 for a vehicle using the multi-insert cap blow-molding method 200 according to the present invention. The procedure will be described with reference to FIG. 6.

Recently, the spoiler 100 for a vehicle performs functions of not only ensuring driving stability at high speeds but also improving an aesthetic appearance of the vehicle. From this point of view, the fastening member 110 coupled to the trunk lid may have a substantial height depending upon a taste and a need of a user.

When molding the fastening member 110 having a substantial height, the multi-insert cap blow-molding method 200 according to the present invention is used. The multi-insert cap blow-molding method 200 according to the present invention largely comprises a fastening member seating process 210, a parison positioning process 220, an air blowing process 230 and a product discharging process 240.

For the sake of convenience of explanation, it is supposed that molds are positioned up and down and therefore are called an upper mold 30 and a lower mold 40. As shown in FIG. 5A, the upper mold 30 and the lower mold 40 define cavities which have surface contours corresponding to the desired shape of the spoiler 100 to be molded. A fastening member seating groove 120 into which the fastening member 110 is seated is defined in the lower mold 40. The fastening member seating groove 120 has a depth capable of accommodating the height of the fastening member 110. The air discharge passage 121 is defined at the bottom of the fastening member seating groove 120 so that air existing in the fastening member 110 can be discharged to the outside as compressed hot air is blown into the parison.

In the fastening member seating process 210, the fastening member 110, which is constituted by the outer insert cap 111 defining the outer appearance of the fastening member 110 and the inner insert cap 112 disposed in the outer insert cap 111, is seated in the fastening member seating groove 120. At this time, the inner insert cap 112 comprises the upper plate 112a having a predetermined diameter and the plurality of supporting legs 112b formed on the lower surface of the upper plate 112a. The inner insert cap 112 is separated from the bottom wall of the outer insert cap 111 by the pre-selected distance which corresponds to the length of the supporting legs 112b. The upper plate 112a divides at a desired position on the inner surface of the outer insert cap 111 the space defined in the outer insert cap 111 into the upper space A to which the parison is fused and the lower space.

The outer insert cap 111 is seated in the fastening member seating groove 120 such that the flange 111b is exposed out of the fastening member seating groove 120 so as to be integrally fused with the parison which constitutes the spoiler body in the subsequent process.

The bottom wall of the outer insert cap 111 is defined with the vent holes 113 and the blow pin insertion hole 116a. Also, the locking bolt 114 is secured to the bottom wall of the outer insert cap 111 to allow the fastening member 110 to be easily coupled to the trunk lid of the vehicle.

Next, in the parison positioning process 220 as shown in FIG. 5B, the hollow parison is conveyed between the upper mold 30 and the lower mold 40, and the upper mold 30 is lowered to enclose the parison.

Referring to FIGS. 5C and 5D, in the air blowing process 230, compressed hot air is blown into the parison 60 through the blow pin 130. At this time, the compressed hot air blown into the parison 60 fuses the parison 60, and the parison 60 is inflated against the surfaces of the upper and lower molds 30 and 40 which define the cavities 50, whereby the parison 60 constitutes the body 101 of the spoiler 100 for a vehicle.

The blow pin 130 defines a path through which compressed hot air externally supplied is blown into the parison 60 and has a tubular configuration. The distal end of the blow pin 130 passes through the air discharge passage 121 defined in the lower mold 40 and the blow pin insertion holes 116a and 116b defined in the bottom wall of the outer insert cap 111 and the upper plate 112a of the inner insert cap 112, with the outer insert cap 111 and the inner insert cap 112 constituting the fastening member 110, such that the distal end of the blow pin 130 is positioned in the parison 60 to blow air into the parison 60.

Accordingly, a portion of the parison 60 which is fused by the hot air blown into the parison 60 through the blow pin 130 is introduced into the fastening member 110 which is seated in the fastening member seating groove 120 and is fused to the inner surface of the fastening member 110, that is, the inner surface of the upper space A which is defined by the outer insert cap 111 and the inner insert cap 112.

As the parison 60 is introduced into the upper space A of the fastening member 110, air existing in the upper space A of the fastening member 110 is discharged to the outside through the air discharge space 115 defined by the upper plate 112a of the inner insert cap 112 of the fastening member 110, the vent holes 113 defined in the bottom wall of the outer insert cap 111, and the air discharge passage 121 defined at the bottom of the fastening member seating groove 120. As a consequence, the softened parison 60 can be easily fused to the inner surface of the side wall of the fastening member 110 without experiencing resistance by captured air. The fused parison 60 is blocked by the upper plate 112a of the inner insert cap 112, is prevented from reaching the bottom wall of the outer insert cap 111, and is fused to the inner surface of the fastening member 110, that is, the inner surface of the upper space A which is defined by the outer insert cap 111 and the upper plate 112a of the inner insert cap 112.

Hence, as the flange 111b of the outer insert cap 111 is fused to the lower surface of the spoiler body via the fused parison 60 and the portion of the parison 60 introduced into the fastening member seating groove 120 is fused to the inner surface of the upper space A of the fastening member 110, the fastening member 110 is integrally formed with the lower surface of the spoiler 100.

As shown in FIG. 5D, the blow pin 130 may be positioned at a side of the lower mold 40 as the occasion demands to blow air into the parison 60.

The spoiler 100 for a vehicle which has integrally formed therewith the elongate fastening members 110 is cooled by cooling water, etc. and is discharged out of the molds 30 and 40 to undergo finishing work, as shown in FIG. 5E.

As is apparent from the above description, the present invention constructed as mentioned above provides advantages in that, since a fastening member which is fused to a hollow plastic product and has a substantial height is composed of an outer insert cap defining the outer contour of the fastening member and an inner insert cap capable of adjusting a distance through which the fastening member is fused to the hollow plastic product, it is possible to mold a narrow and elongate product and to define various contours through the use of a plurality of insert caps.

Further, in a spoiler for a vehicle according to the present invention, because a fastening member having a substantial height can be stably fused to the lower surface of the spoiler, not only the spoiler can perform its original function, but also it is possible to render an aesthetic appearance of the spoiler. Moreover, when the spoiler is coupled to the vehicle, sufficient strength can be obtained.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A multi-insert cap blow-molding method for molding a hollow plastic product which is integrally formed with elongate fastening members, the method comprising:

seating each fastening member in a fastening member seating groove which is defined in a lower mold, each fastening member being composed of an outer insert cap which defines an elongate configuration to have a substantial depth and an inner insert cap which is positioned to be separated from a bottom surface of the outer insert cap by a predetermined distance and divides a space defined in the outer insert cap into an upper space and a lower space;

positioning a hollow parison between an upper mold and the lower mold which are defined with cavities having predetermined contours;

blowing hot air into the parison with the upper and lower molds enclosing the parison, molding the parison in conformity with the predetermined contours of the cavities, and integrally fusing a portion of the parison to an inner surface of the fastening member; and cooling, discharging and finishing a resultant product which has fused therewith the fastening members.

2. The method as set forth in claim 1, wherein fastening members are provided such that the outer insert cap of each fastening member comprises a cup-shaped outer insert cap body which has a substantial depth, a flange which is integrally formed with an upper end of the outer insert cap body, a plurality of vent holes which are defined in a bottom wall of the outer insert cap body, and a fastening bolt which is secured to the bottom wall of the outer insert cap body.

3. The method as set forth in claim 2, wherein fastening members are provided such that a bottom wall of the outer insert cap and the upper plate of the inner insert cap of each fastening member are defined with blow pin insertion holes which have a predetermined diameter.

4. The method as set forth in claim 3, wherein hot air is supplied into the parison through a blow pin which passes through the blow pin insertion holes.

5. The method as set forth in claim 1, wherein fastening members are provided such that the inner insert cap of each fastening member comprises an upper plate which has a predetermined size to divide the space defined in the outer insert cap into the upper space and the lower space.

6. The method as set forth in claim 5, wherein fastening members are provided such that the inner insert cap of each fastening member further comprises a plurality of supporting legs which are integrally formed on a lower surface of the upper plate.

7. The method as set forth in claim 5, wherein fastening members are provided such that the upper plate of the inner insert cap of each fastening member is separated from an inner surface of a side wall of the outer insert cap or is defined with a hole so that air existing in the fastening member can be discharged to the outside.

8. The method as set forth in claim 5, wherein a bottom wall of the outer insert cap and the upper plate of the inner insert cap are defined with blow pin insertion holes which have a predetermined diameter.

9. The method as set forth in claim 8, wherein hot air is supplied into the parison through a blow pin which passes through the blow pin insertion holes.

10. The method as set forth in claim 1, wherein the portion of the parison is integrally fused to the fastening member such that the portion of the parison is fused to an inner surface of the upper space which is delimited in the outer insert cap by the inner insert cap, that is, to the inner surface of the side wall of the outer insert cap and an upper surface of the upper plate of the inner insert cap.

* * * * *